(12) United States Patent
Raghoebardajal

(10) Patent No.: US 10,902,617 B2
(45) Date of Patent: Jan. 26, 2021

(54) DATA PROCESSING FOR POSITION DETECTION USING OPTICALLY DETECTABLE INDICATORS

(71) Applicant: Sony Interactive Entertainment Inc., Tokyo (JP)

(72) Inventor: Sharwin Winesh Raghoebardajal, London (GB)

(73) Assignee: Sony Interactive Entertainment Inc.

( * ) Notice: Subject to any disclaimer, the term of this patent is extended or adjusted under 35 U.S.C. 154(b) by 63 days.

(21) Appl. No.: 16/283,145

(22) Filed: Feb. 22, 2019

(65) Prior Publication Data

US 2019/0304101 A1 Oct. 3, 2019

(30) Foreign Application Priority Data

Mar. 28, 2018 (GB) .................................. 1805005.4

(51) Int. Cl.
| | |
|---|---|
| *A63F 13/22* | (2014.01) |
| *A63F 13/24* | (2014.01) |
| *G06T 7/246* | (2017.01) |
| *A63F 13/213* | (2014.01) |
| *A63F 13/323* | (2014.01) |
| *G06F 3/01* | (2006.01) |
| *A63F 13/211* | (2014.01) |

(52) U.S. Cl.
CPC ............ *G06T 7/248* (2017.01); *A63F 13/213* (2014.09); *A63F 13/22* (2014.09); *A63F 13/24* (2014.09); *A63F 13/323* (2014.09); *G06F 3/011* (2013.01); *G06F 3/012* (2013.01); *A63F 13/211* (2014.09); *G06T 2207/10016* (2013.01)

(58) Field of Classification Search
None
See application file for complete search history.

(56) References Cited

U.S. PATENT DOCUMENTS

| | | | | |
|---|---|---|---|---|
| 2016/0187970 | A1* | 6/2016 | Ashforth | .............. G06F 3/013 345/8 |
| 2020/0089333 | A1* | 3/2020 | Benson | .............. G02B 27/017 |

FOREIGN PATENT DOCUMENTS

GB 2515353 A 12/2014

OTHER PUBLICATIONS

Combined Search and Examination Report Under Sections 17 and 18(3), dated Jul. 20, 2018 of Great Britain Patent Application No. GB1805005.4, filed on Mar. 28, 2018.
Extended European Search Report, dated Jul. 31, 2019 of European Patent Application No. 19157556.2.

* cited by examiner

*Primary Examiner* — Dov Popovici
(74) *Attorney, Agent, or Firm* — Lerner, David, Littenberg, Krumholz & Mentlik, LLP

(57) ABSTRACT

A data processing device includes a camera to capture successive images of an optically detectable indicator of a second data processing device; a location detector configured to detect a location of the data processing device; a data receiver to receive location information from the second data processing device; and a processor to detect a mapping between the image location, in images captured by the camera, of the optically detectable indicator of the second data processing device, the communicated location of the second data processing device and the detected location of the data processing device.

11 Claims, 15 Drawing Sheets

LEFT RIGHT

DATA PROCESSING FOR POSITION DETECTION USING OPTICALLY DETECTABLE INDICATORS

CROSS-REFERENCE TO RELATED APPLICATION

The present application claims priority to United Kingdom Application No. 1805005.4, filed on Mar. 28, 2018, the disclosure of which is hereby incorporated by reference herein.

BACKGROUND

Field of the Disclosure

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

It has been proposed to provide detection arrangements for detecting a relative location of one device (such as an HMD) from another device, by using a camera on the one device to detect images of one or more markers, for example on the other device.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides a data processing device comprising:
  a camera to capture successive images of an optically detectable indicator of a second data processing device;
  a location detector configured to detect a location of the data processing device;
  a data receiver to receive location information from the second data processing device; and
  a processor operable in a calibration phase to detect a mapping between the image location, in images captured by the camera, of the optically detectable indicator of the second data processing device, the communicated location of the second data processing device and the detected location of the data processing device.

Another example embodiment provides a method of calibration operation of a data processing device, the method comprising:
  capturing successive images of an optically detectable indicator of a second data processing device;
  detecting a location of the data processing device;
  receiving location information from the second data processing device; and
  detecting a mapping between the image location, in images captured by the camera, of the optically detectable indicator of the second data processing device, the communicated location of the second data processing device and the detected location of the data processing device.

Another example embodiment provides a method of operation of a data processing device, the method comprising:
  capturing successive images of an optically detectable indicator of a second data processing device;
  detecting a location of the data processing device;
  detecting a location of the second data processing device by interpolation between the mappings detected by the method defined above.

Example embodiments provide computer software which, when executed by a computer, causes the computer to perform the steps of any one of the methods defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
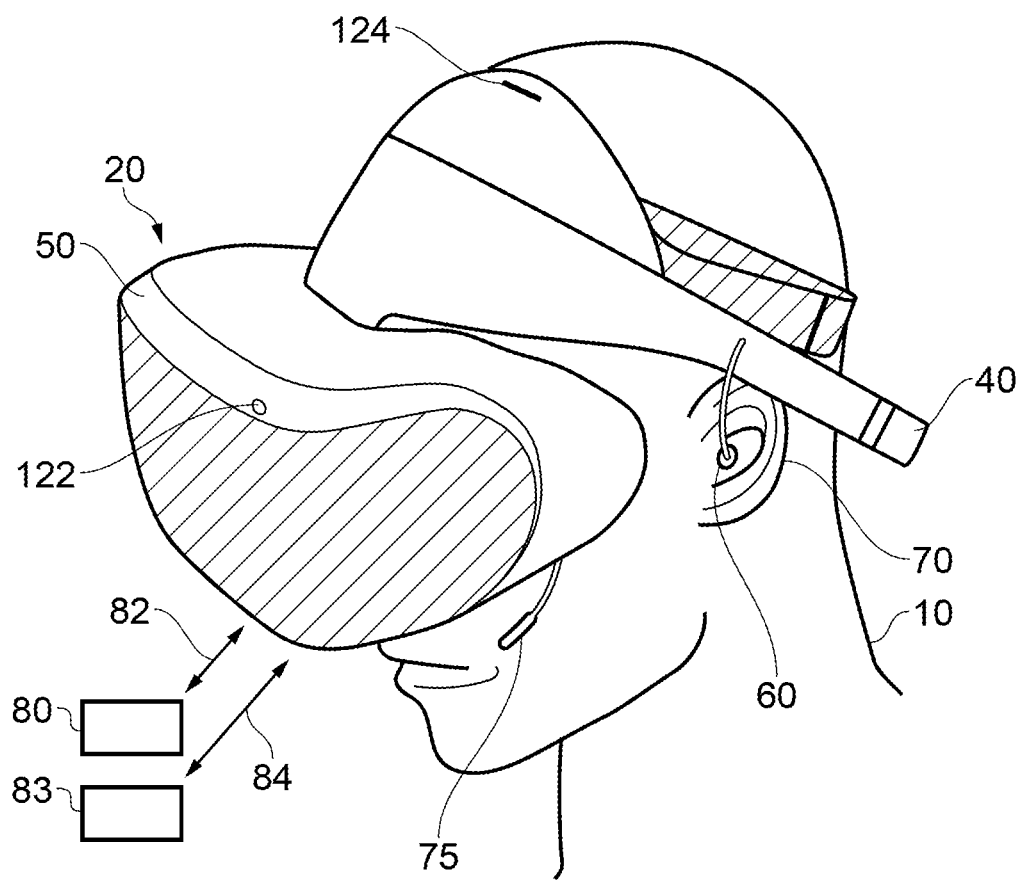
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
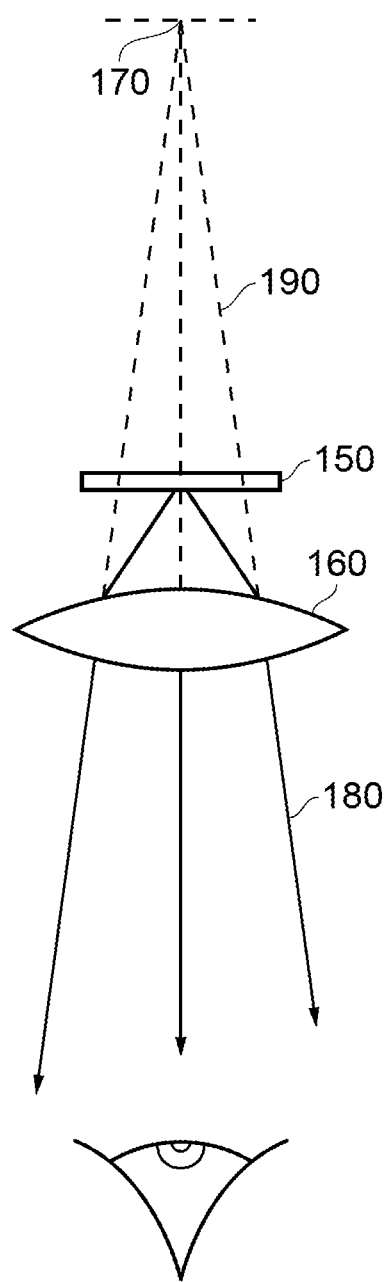
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
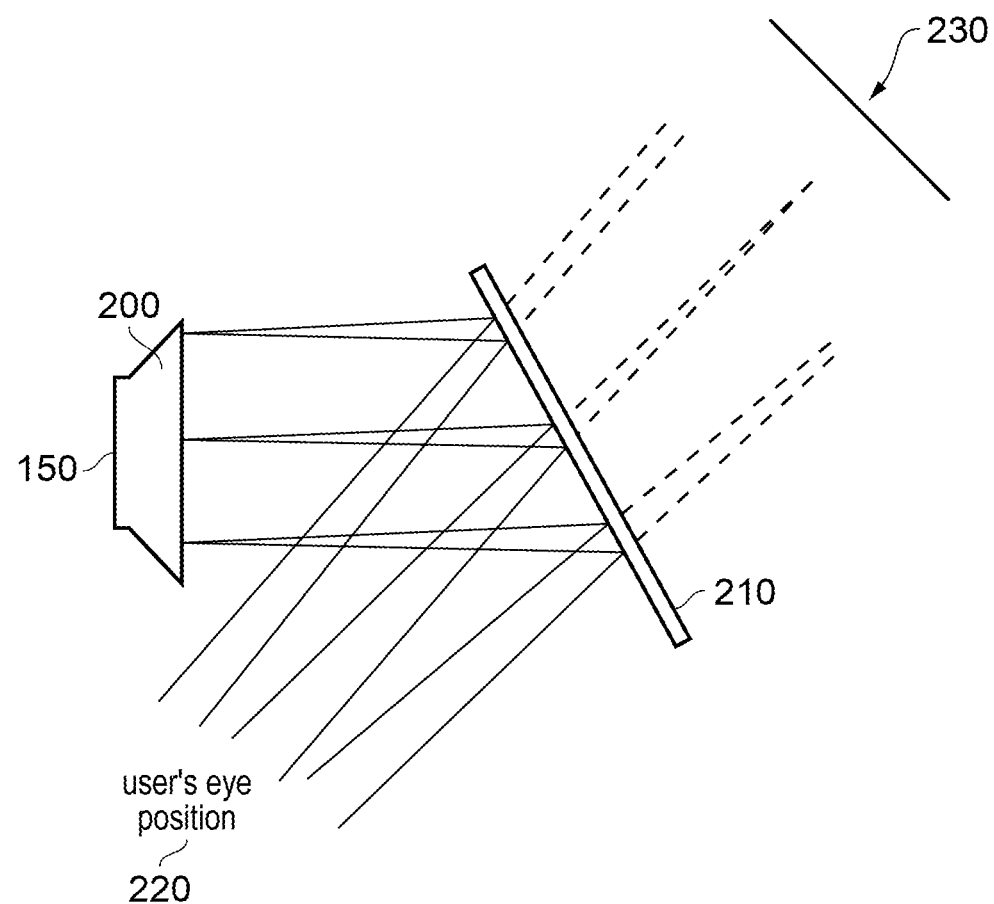
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
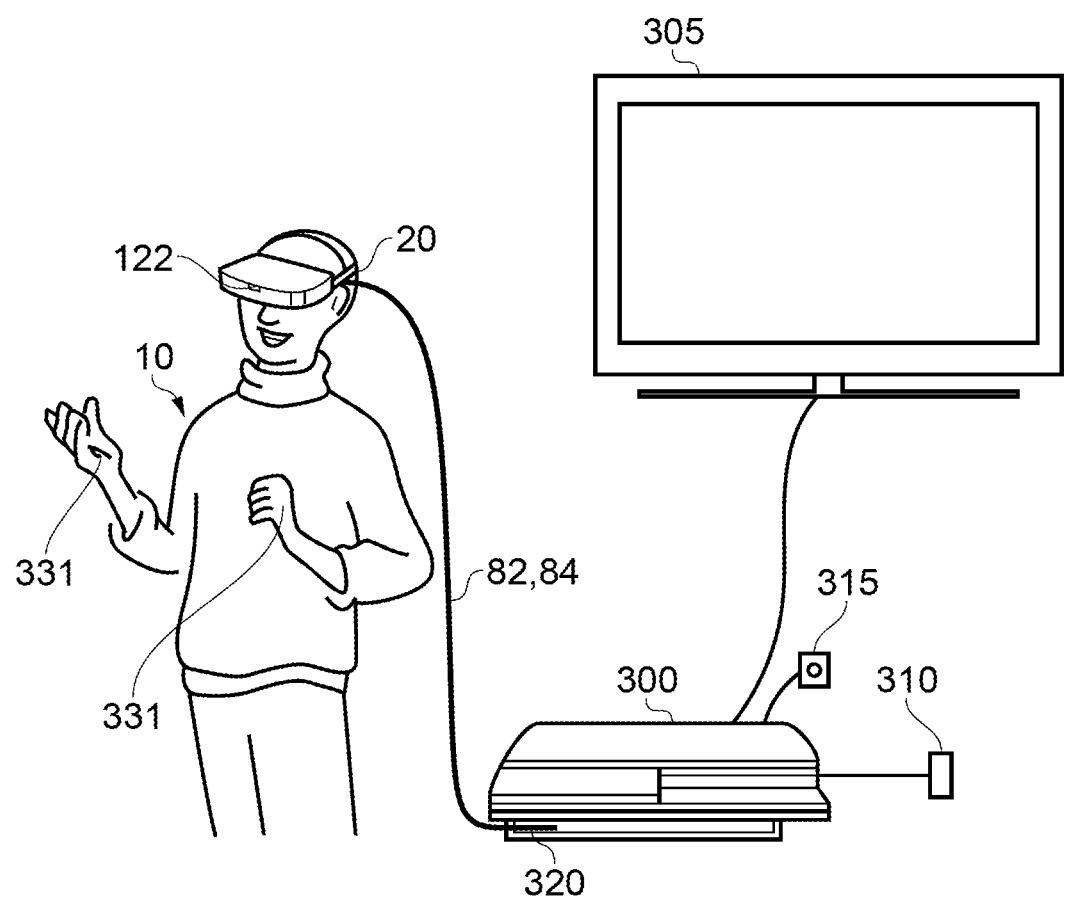
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
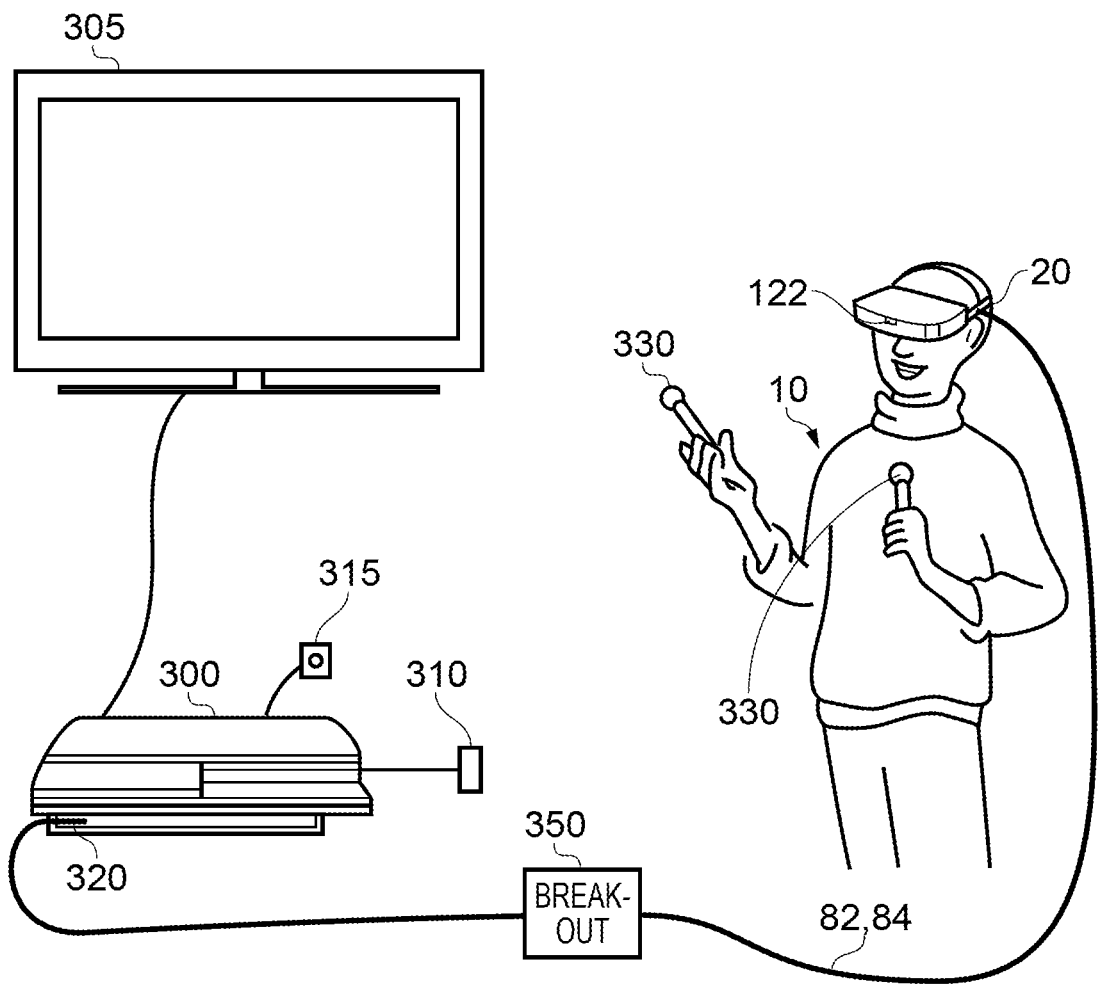

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. The user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
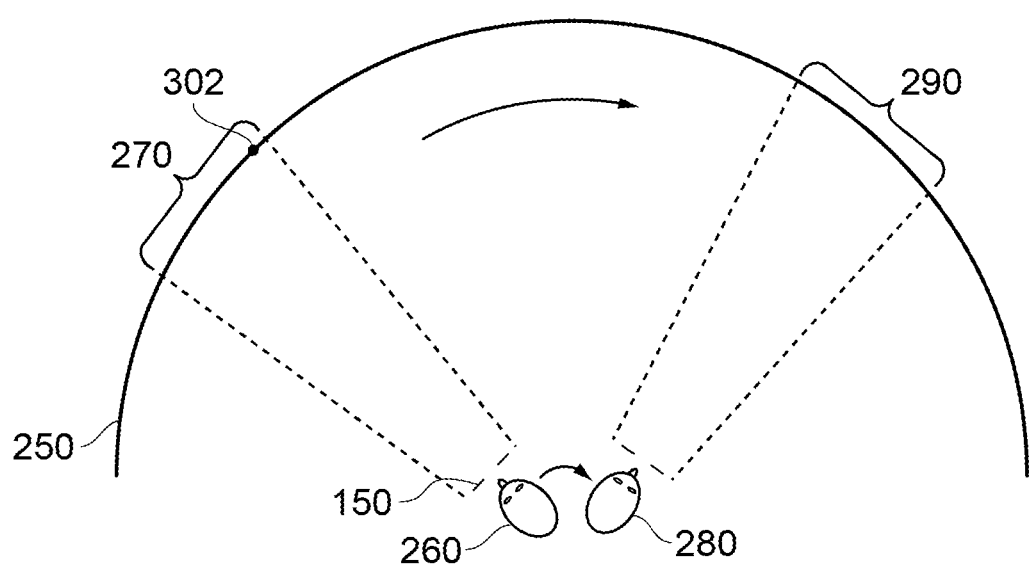
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 302, this will effectively move in the opposite direction to the head movement. So, if the head movement is to the right, the apparent viewpoint moves to the right but an object such as the displayed object 302 which is stationary in the virtual environment will move towards the left of the displayed image and eventually will disappear off the left-hand side of the displayed image, for the simple reason that the displayed portion of the virtual environment has moved to the right whereas the displayed object 302 has not moved in the virtual environment.

Figure 2:
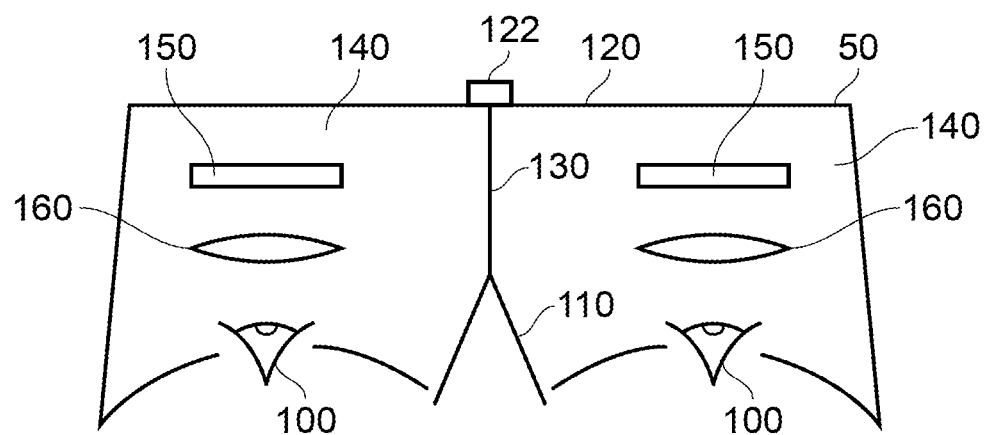
FIG. 2 is a schematic plan view of an HMD.
Figure 9A:
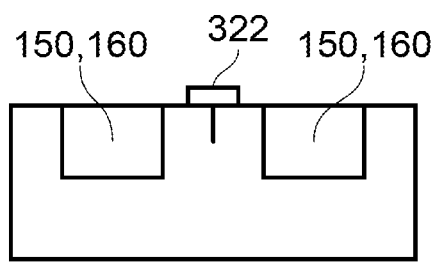
FIGS. 9a and 9b schematically illustrate HMDs with motion sensing.
Figure 9B:
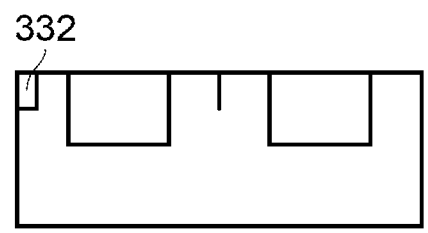

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
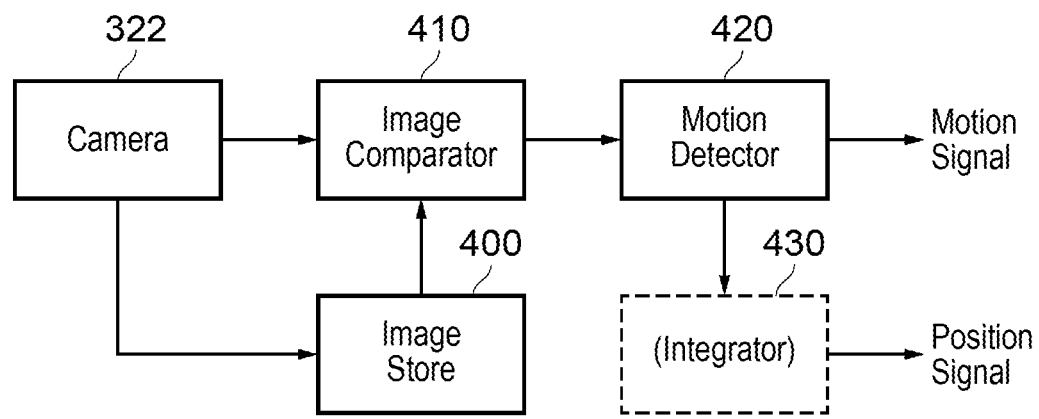
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

Alternatively or in addition, absolute tracking of feature points may be used when analysing images captured from a camera mounted on the HMD. Hence for example light emitting diodes or other static image features (including a TV screen for example) may be identified as features and tracked (for example using sub-pixel positions of LED's in the image) to calculate movement of the HMD with respect to these feature points.

Alternatively or in addition, a separate fixed camera 315 may monitor the HMD, which may comprise LEDs or similar light sources itself (see FIGS. 13 and 14, discussed later herein). Video images from this fixed camera may be analysed for absolute tracking of feature points (for example using sub-pixel positions of LED's on the HMD) to calculate motion of the HMD.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
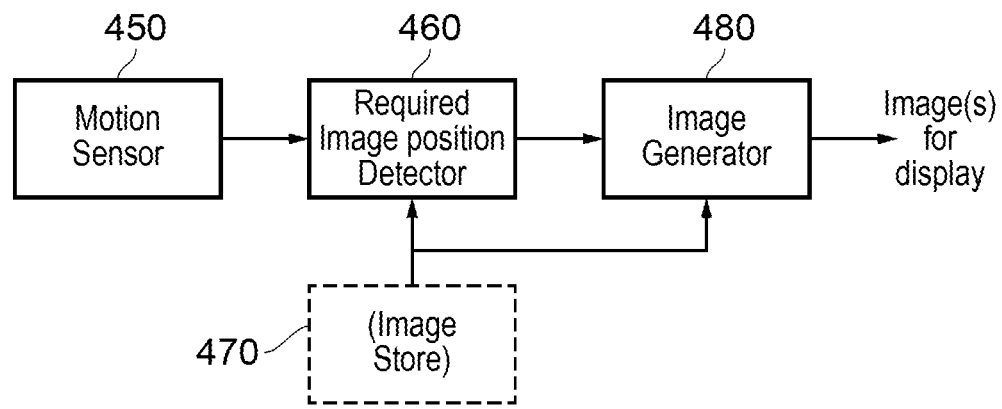
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
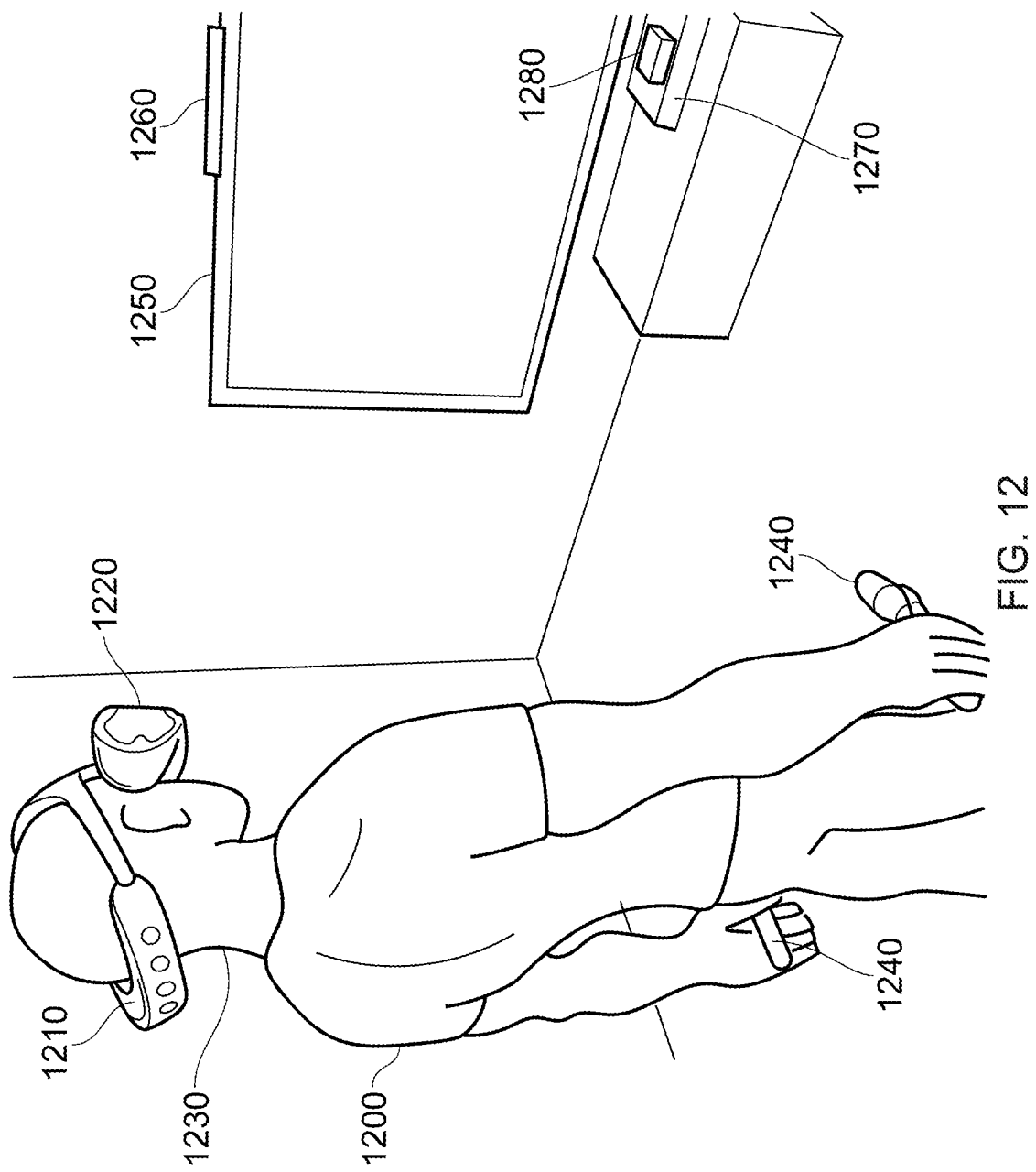
FIG. 12 schematically illustrates a user wearing an HMD and engaged in a video game.

FIG. 12 schematically illustrates a user wearing an HMD and engaged in a video game. In many respects, the arrangement of FIG. 12 is similar to that of FIG. 7 discussed above, but for clarity of the diagram the cabled connections 82, 84 and the optional break-out box 350 of FIG. 7 are not shown. However, FIG. 12 does illustrate an example of the relative positioning of the user and other components in normal operation.

In FIG. 12, the user 1200 is wearing an HMD 1210 having one or more markers 1220 at the front of the HMD (where the term "front" is relative to an orientation of the user's head) and one or more markers 1230 at the rear of the HMD, for example, on a head strap. The user carries a hand held controller 1240 in each hand (in this example). The user is facing a television screen 1250. Of course, it is recognised that when the user is wearing the HMD 1210, the user does not himself observe the television screen. However, facing the television screen provides a natural orientation to other components of the apparatus. The television screen may, as discussed above, provide a so-called "social screen" representing images indicative of game action being played by the user 1200, for the enjoyment of other nearby people who are not wearing HMDs.

Situated around the television screen are a light bar 1260, to be discussed below, a games console 1270 and a camera 1280.

In operation, one or more of the devices (namely the HMD 1210, the console 1270 and the hand-held controllers 1240) have at least one camera and using the camera, the devices detect the positions (or at least the relative positions) of other ones of the devices by means of detecting markers in captured images. To assist with this, the HMD comprises front and rear markers as discussed; the light bar 1260 can provide a marker indicating a location of or relative to the television screen console, and the hand-held controllers 1240 can provide respective markers. Other devices (for example, a second HMD worn by another user, and/or one or more other peripheral devices) can also detect the relative position of devices shown in FIG. 12 and also be detected by those devices. In some examples, the devices share the data defining the relative positions of other devices, as detected using the respective cameras, so that collectively, or via a master device such as the console 1270 handling the collection and amalgamation of the position data, a map or specification of the positions within the game playing area of each of the devices can be derived based on their respective relative position detections.

Figure 13:
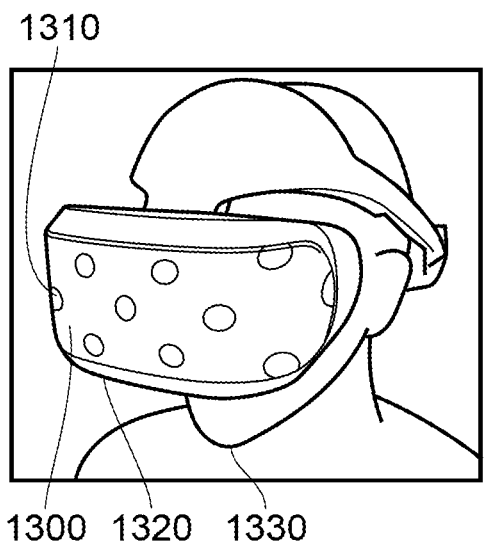
FIGS. 13 and 14 are respective front and rear schematic views of and HMD.

In FIG. 13, the front surface 1300 of the HMD worn by the user has a plurality of LEDs (or other light emitting portions, illuminated portions, or passive features 1310) disposed so that those features can be detected by a camera detected towards the HMD. The LEDs or features 1310 can collectively be considered as a "marker" having multiple marker portions (such as the individual LEDs). A reason for having multiple marker portions is to assist in distinguishing the marker from other image features in the captured images. Also, having multiple marker portions allows an estimation of the separation distance from the camera to the detected marker, in that the distance (in the captured images) between marker portions such as LEDs will be smaller for a more distant HMD (with respect to the camera capturing the images) and larger for a closer HMD. In this way, the marker comprises two or more spatially separated marker portions; and the detector is configured to detect respective image locations of images of the marker portions in the given captured image.

Figure 14:
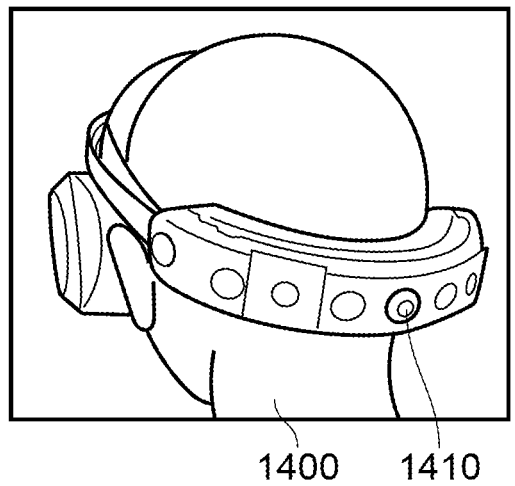

FIG. 14 schematically illustrates a rear view of the HMD in which a further marker comprising multiple marker portions 1400 is provided. So, if the user turns his back on the console and its associated camera, or if other peripheral devices are disposed behind the user in use, the location of the HMD can still be optically detected using a camera.

Figure 15:
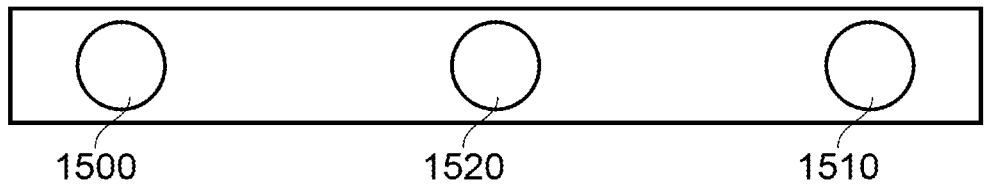
FIG. 15 schematically illustrates a light bar.

FIG. 15 schematically illustrates a light bar of the type shown in FIG. 12, having a marker comprising marker portions (such as LEDs) 1500, 1510. A further LED or indicator 1520 can be provided, for example to give timing information to the other devices in the system. By transmitting (for example) an encoded stream of optical pulses using the LED 1520, the optical position detections by other devices in the overall apparatus can be synchronised to a common time frame specified by the console. By positioning the LED 1520 between the marker portions 1500, 1510, its location can be inferred in a captured image even when the LED 1520 is not currently illuminated. So, a pattern of illumination and non-illumination can be detected for the LED 1520 by virtue of its location relative to the marker portions 1500, 1510. Therefore, in examples, an optically detectable indicator (the indicator 1520) comprises an electrically illuminable element such as a light emitting diode.

Figure 16:
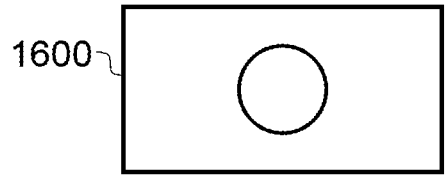
FIG. 16 schematically illustrates a camera.

FIG. 16 schematically illustrates a camera 1600 associated with the console and, as in the example of FIG. 12, may be positioned close to the position of the console.

Figure 17:
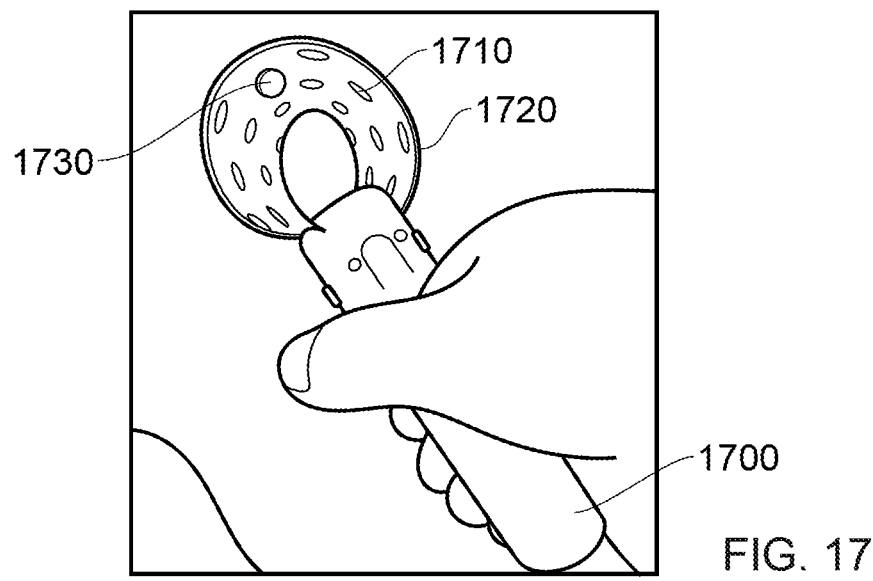
FIG. 17 schematically illustrates a hand-held controller.

FIG. 17 schematically illustrates a hand-held controller 1700 having a marker 1710 formed of multiple marker portions 1720 disposed at its distal end. A camera 1730 may also be provided.

So, each of the devices shown in FIG. 12 may provide a marker having one or more marker portions and a camera. For the console, the camera is the camera 1600 of FIG. 16. For the hand-held controllers, the camera is provided as the camera 1730 of FIG. 17. For the HMD, because the orientation of the HMD can vary dramatically during use, multiple cameras may be provided, such as cameras 1320, 1330 facing forwards and a camera 1410 facing backwards.

Figure 18:
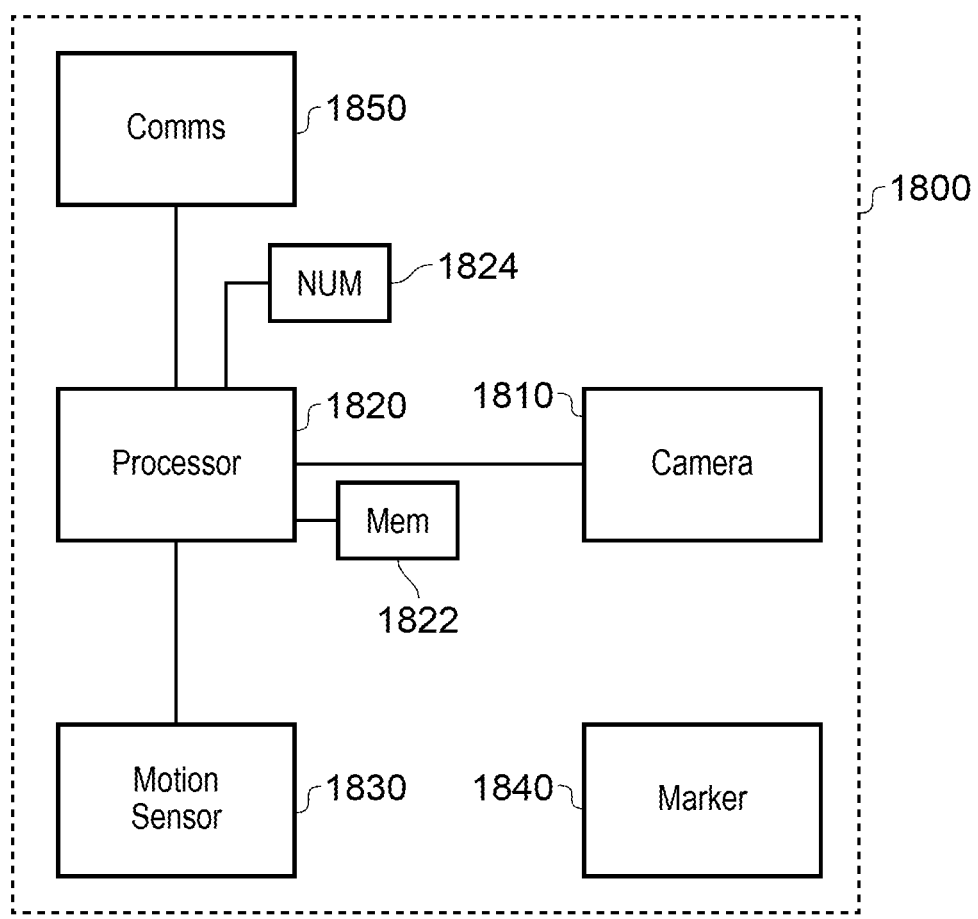
FIG. 18 schematically illustrates a data processing device.

FIG. 18 schematically illustrates a data processing device, for example representing one or more of: the HMD, the handheld controller(s) and the console of FIG. 12. Only those features relative to the current discussion are shown in FIG. 18; other data processing functionality not shown in FIG. 18 may also be provided.

In FIG. 18, the data processing device 1800 comprises a camera 1810 configured to capture successive images according to an image capture period. A processor 1820 having an associated memory 1822 such as a random access memory (RAM) and executing program instructions stored in a non-volatile memory (NVM) 1824 such as a flash memory or a read only memory (ROM), is arranged to detect, from images captured by the camera 1810, information indicating a relative location of a remote marker with respect to the data processing device 1800. For example, the detector may be configured to detect an image of the marker within a given captured image and to derive a relative location of the marker, relative to the current location of the device 1800, using techniques to be discussed below.

A motion sensor 1830 such as an inertial motion sensor is arranged to detect motion of the data processing device 1800 and optionally to control operation of the processor 1820 in response to the detected motion. The data processing device 1800 may also provide a marker 1840, for example having one or more marker portions as discussed above. A communications ("comms") module 1850 provides data communication with other data processing devices in the overall apparatus.

The motion sensor 1830 can be used by the device 1800 to detect a location of the device 1800, for example by the device 1800 integrating one or more of detected motion, detected changes in location and/or detected acceleration, as detected by the motion sensor 1830. However, using the camera 1810 and the remote marker(s) provided at other devices, the relative location of the device 1800 and those other devices can be detected by the device 1800 (and indeed the inverse, which is to say the relative location of the device from the point of view of those other devices can be detected by the other devices. In order to achieve this, a mapping is generated and applied between image location of an image of a marker on another device (for example in an image captured by the camera 1810 of the device 1800) and the location of that other device relative to the device 1800.

The description which follows concerns example techniques for generating such a mapping. The techniques discussed below can be performed, for example, during an initialisation phase of operation of the cohort of devices such as the devices shown schematically in FIG. 12, for example (though not exclusively) on a pair-wise basis by a device amongst the cohort having a camera which can currently capture images of a marker on another of the devices. Note that the process need not be a symmetric process, in that the fact that a camera on device A can view a marker on device B does not necessarily imply that a camera on device B can view a marker on device A. For example, the marker on a device may be on another side of the device to the camera, or the marker may be visible over a wider field of view than can be captured by that device's camera. However, in at least some examples, the process may be carried out symmetrically as between a device and another device.

Figure 19:
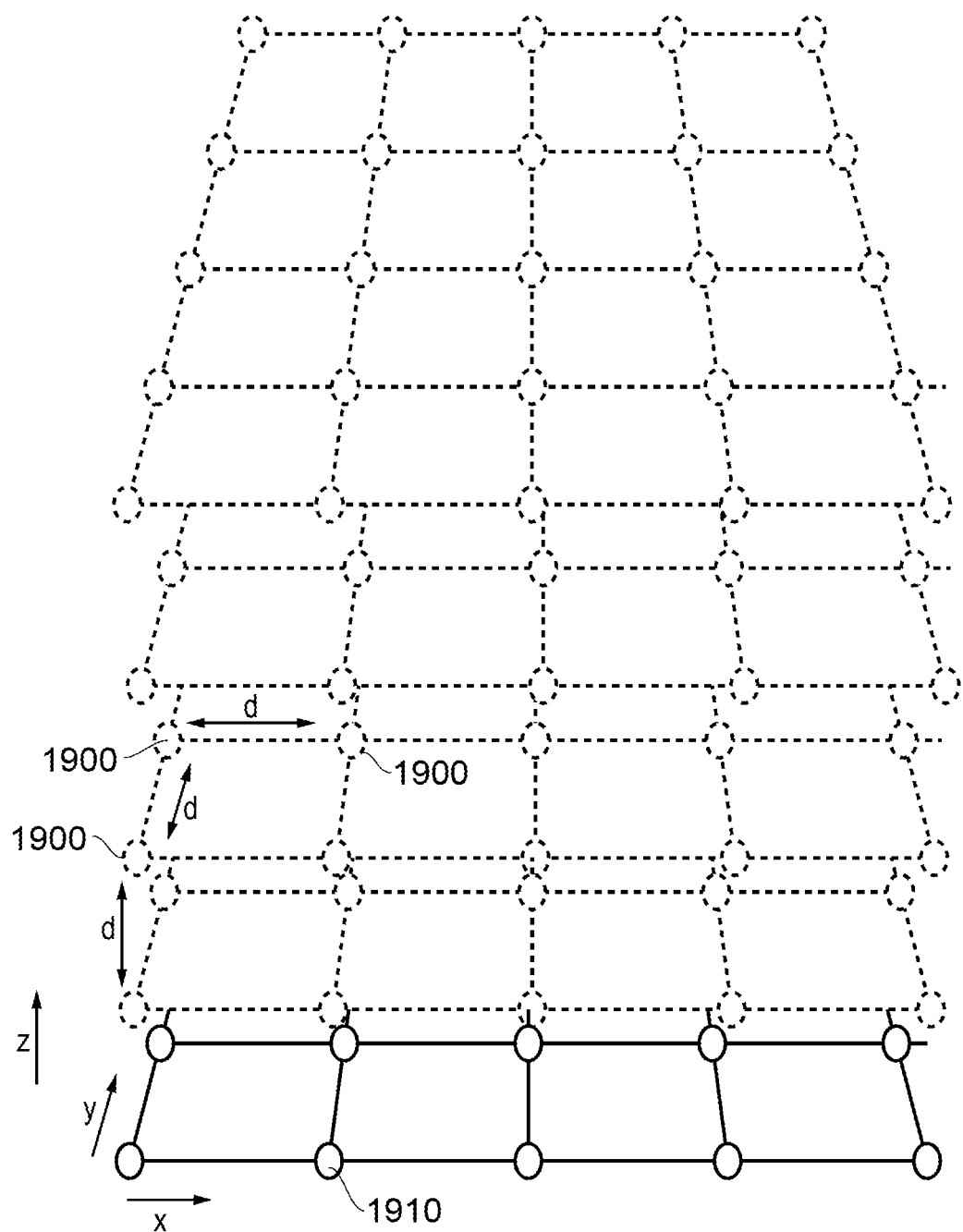
FIG. 19 schematically illustrates an array of locations in physical space.

FIG. 19 schematically illustrates a three dimensional array or grid of locations 1900 in (physical) space, for example being separated by a distance d in the (x,y,z) directions (though different respective separations could define the array for one or more axes, and the array locations do not need to be evenly spaced). The z direction may be a depth parameter (away from the camera making the observation) and the x and y axes may be two perpendicular axes in a plane of constant z.

For example, d may be 30 cm. Each array location 1900 is surrounded by a spherical margin 1910 or search range of, for example, 10 cm in diameter. Using its respective motion detector 1830, each device 1800 in the cohort detects when that device has moved (during the initialisation phase) from one array location to another, at least to within the tolerance of the search range 1910, that device detects a current mapping (at that array location) linking the location of that device to the image location of the marker of the other device at the current location of the other device. The other device may be moving during this procedure or may be stationary. In this way, an array of point mappings of image location of the marker B in image captured by the camera A is obtained.

Figure 20:
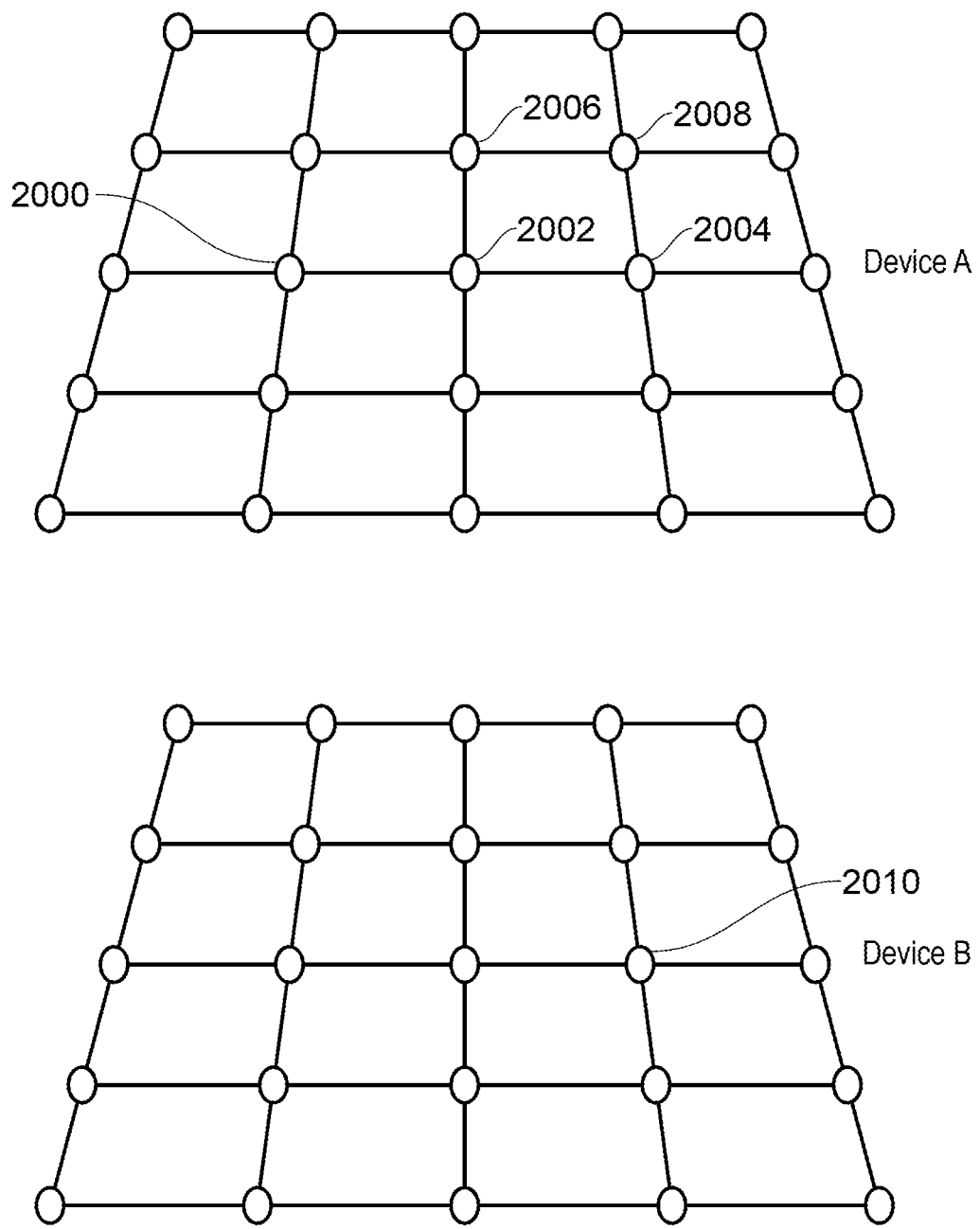
FIG. 20 schematically illustrates a mapping process.

FIG. 20 schematically illustrates this process. For clarity of the diagram just one plane (in the z direction) of array locations has been shown for each of two arbitrary devices, devices A and B, amongst the example cohort of FIG. 12.

When a device, for example device A, is inside a search range 1910 of a particular array location 2000, the other device, device B, acquires an image of the marker of device A and from this generates a transform linking that location 2000 to the image location and to the current location of the camera of device B. Similarly, when device B is inside a search range 1910 of a particular array location 2010, the other device, device A, acquires an image of the marker of device B and from this generates a transform linking that location 2010 to the image location and to the current location of the camera of device A. This process can be continued to generate an array of transforms linking image locations of a device, the location in space of that device (as detected from that device's motion sensor) and the location in space of the capturing camera. Indeed, the process can be carried out by the user being instructed to move at least some of the devices around in space to allow multiple such points to be captured. Note that the games console itself (or at least the camera and/or marker associated with it) is less likely to be movable than at least some of the other devices.

It will be appreciated that for example where two cameras are used, it is possible that they will function slightly differently, for example having slightly different image rectification or distortion properties. Furthermore, these relative differences can change with the age of the device and in response to environmental factors such as temperature. Consequently the techniques described herein can thus be used to keep a real/virtual space shared between the tracked devices consistent by verifying the results between devices at a regular basis. Similarly the real/virtual space of different tracking devices/cameras can be calibrated using these techniques.

Figure 21:
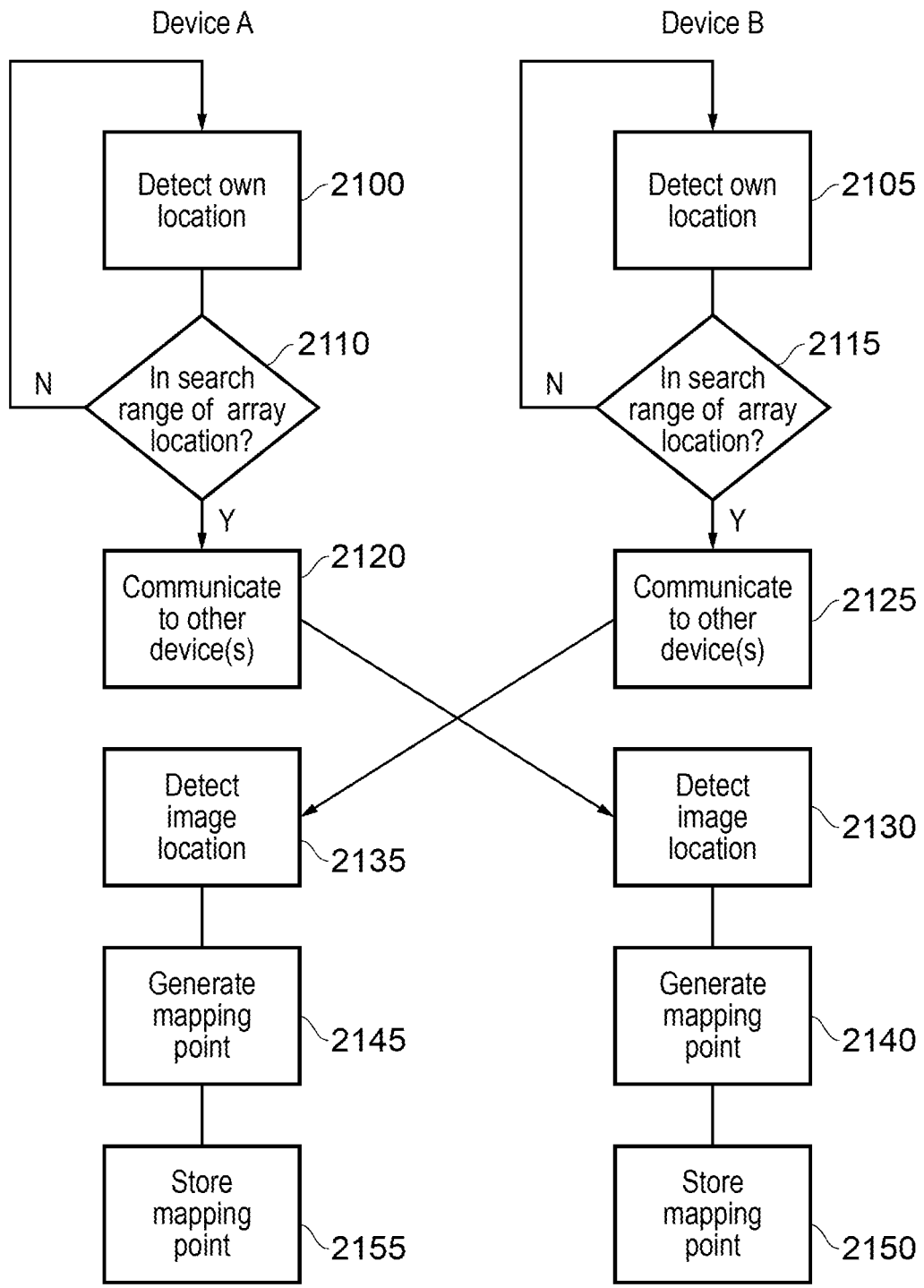
FIGS. 21 to 24 are schematic flowcharts illustrating respective methods.

FIG. 21 is a schematic flowchart illustrating this technique. In FIG. 21, two devices, device A and device B, are represented schematically by respective left and right columns. In the method, a device detects its own location and this information is then handled by the other device. In other words, during the initialisation phase (but not in a following operational phase) there is data traffic between devices disclosing their positions. In the operational phase, as a consequence of the preparation of mapping data during the initialisation phase, the detection of the location (or at least the relative location) of another device can be passive as regards that (detected) device, which is to say that there is no need for the detecting device to query or receive active data from the detected device.

In some regards, FIG. 21 may be considered as having two threads or streams of activity: (i) a stream in which the device A detects its own location and this information is then handled by device B (represented by flowchart steps numbered ending in 0) and (ii) a stream in which the device B detects its own location and this information is then handled by device A (represented by flowchart steps numbered ending in 5). The streams (i) and (ii) are symmetrical and so only one will be discussed in detail. The other stream may or may not happen, as discussed above, depending on factors such as the viewpoint of a camera associated with each device.

Referring to the stream (i), at a step 2100 the device A detects its own location, using its respective motion sensor 1830 for example. At a step 2110 the device A detects whether it is within a search range of an array location (or in other examples, of an array location it has not been within a search range of in the initialisation procedure carried out so far, or in other words a "new" point as regards the current procedure). If not then control returns to the step 2100. But if yes, then control passes to a step 2120 in which the device A communicates its location to the device B (or indeed one or more other devices for a similar pair-wise interaction).

Note that in other examples, the device A could send its location at each detection, and the recipient device B could do the equivalent of the step 2110 by rejecting any received communicated locations not corresponding to an array location.

The device B responds at a step 2130 by detecting the image location of device A in the device B camera images. At a step 2140, device B generates a mapping appropriate to that image location, the current location of device A as communicated in the step 2120, and the current location of device B as indicated by its own motion sensor 1830. The mapping point is stored by the device B at a step 2150, for example in the memory 1822.

The overall process can be repeated multiple times, over multiple different points at which the image location of device A is captured and a mapping point generated. Similarly, the stream (ii) can generate a similar array of point mappings from device A to device B.

Therefore, the detecting device (device B for the stream (i) or device A for the stream (ii) in FIG. 21) provides an example of a data processing device 1800 comprising: a camera 1810 to capture successive images of an optically detectable indicator of a second data processing device (device A or device B respectively); a location detector 1830 configured to detect a location of the data processing device; a data receiver 1850 to receive location information from the second data processing device; and a processor 1820 operable in a calibration phase to detect a mapping between the image location, in images captured by the camera, of the optically detectable indicator of the second data processing device, the communicated location of the second data processing device and the detected location of the data processing device.

As discussed in connection with the steps 2100, 2110 (which can be carried out to triage location data before being sent to the other device and/or, as discussed above, can be carried out on reception to triage location data to be processed), in example embodiments the processor 1820 is configured to detect a mapping only in response to received location information indicating that the second data processing device is within a predetermined margin of one of a set of predetermined locations in space.

The processor 1820 may store the mapping data—for example in the memory 1822.

The communications module 1850 can also act as a data transmitter to transmit location information to another data processing device, the location information indicating the detected location of the data processing device. In the example case of the triage of location data before sending, the data transmitter can be configured to transmit location information only in response to a detection that the data processing device is within the predetermined margin of one of the set of predetermined locations in space.

Figure 22:
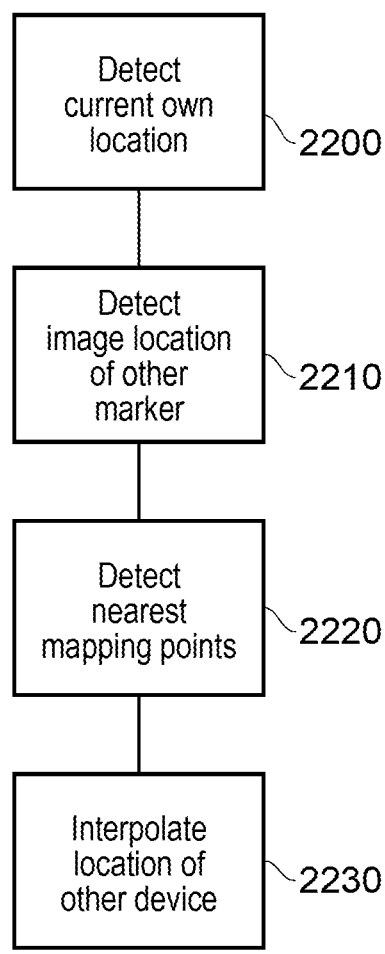

The way in which these mapping points can be used is described by way of example with reference to the schematic flowchart of FIG. 22. This process (once the initialisation process discussed above has been carried out) allows a device to infer the location of another device simply from that device's own captured images and own location, or in other words without the need for inter-device communication of location information.

Referring to FIG. 22, at a step 2200, a device (say, device A) detects its own location, for example using its own motion sensor 1830. At a step 2210, the device A detects the image location of a marker of another device (say, device B) in images captured by device A's camera. Knowing its own location and the array of mappings discussed above, the device A detects the nearest array locations corresponding to points in the array of mappings, in other words the mappings which are nearest to the detected image location of device B. At a step 2230 the device A interpolates a location in space of the device B from the nearest mappings identified at the step 2220.

As an example, consider the points 2002, 2004, 2006, 2008 in the array of locations applicable to device A in FIG. 20. In the course of the initialisation stage, the device B (or indeed any other detecting device) detects a mapping between device A's location and an image position in the captured images, for one or more locations of device B. The mapping data can simply relate image position of device A's marker to device A's location, for example:

| Location (expressed in a physical frame of reference or coordinate system (x, y, z) relative to the observing camera | Image position (x, y) |
| --- | --- |
| 2002 | (600, 600) |
| 2004 | (600, 620) |
| 2006 | (620, 600) |
| 2008 | (620, 720) |

These data are stored for multiple locations of device A and potentially for multiple locations of device B. In response to a detection of a marker at an image position of (say) (610, 605), a simple linear interpolation between the nearest points for which location data has been stored (in this example the points 2002, 2004, 2006, 2008) will indicate a device A location at a point in FIG. 20.

Note that the interpolation can be performed at the time of detection (when a location is needed, or at the step 2230 of FIG. 22) or even in advance of that step, for example, by fitting a best fit curve to the detected mapping data.

Therefore, according to the operations shown in FIG. 22, the device 1800 can provide an example of a data processing device in which the processor is configured during an operational phase to detect a location of the second data processing device by interpolation between the mappings detected in the calibration phase.

Figure 23:
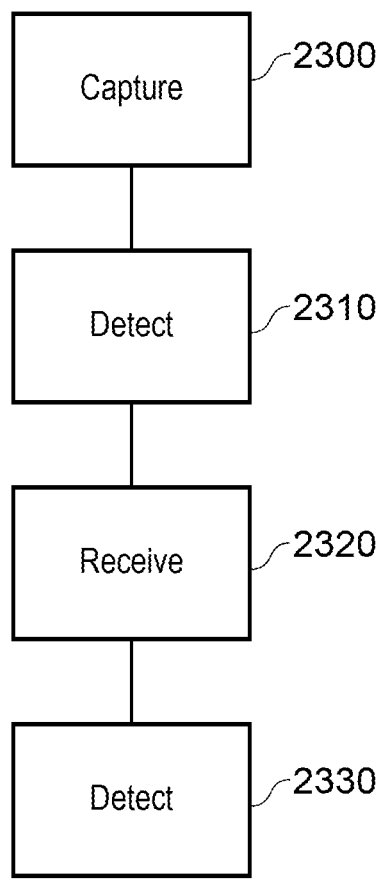
Figure 24:
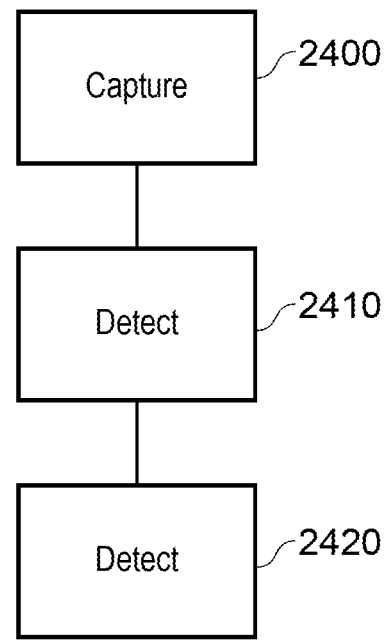

FIGS. 23 and 24 are schematic flowcharts illustrating respective methods which can be carried out, for example, by the processor 1820 of FIG. 18.

In FIG. 23 a method of calibration operation of a data processing device comprises:

capturing (at a step 2300) successive images of an optically detectable indicator of a second data processing device;

detecting (at a step 2310) a location of the data processing device;

receiving (at a step 2320) location information from the second data processing device (and note that the steps 2300-2320 may be carried out in any order, or indeed in parallel); and detecting (at a step 2340) a mapping between the image location, in images captured by the camera, of the optically detectable indicator of the second data processing device, the communicated location of the second data processing device and the detected location of the data processing device.

In FIG. 24 a method of post-calibration (subsequent) operation of a data processing device comprises:

capturing (at a step 2400) successive images of an optically detectable indicator of a second data processing device;

detecting (at a step 2410) a location of the data processing device (and note that the steps 2400-2410 may be carried out in any order, or indeed in parallel); and detecting (at a step 2420) a location of the second data processing device by interpolation between the mappings detected by the method of FIG. 23.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing device comprising:
   a camera to capture successive images of an optically detectable indicator of a second data processing device;
   a motion sensor to provide data used by the data processing device to determine a location of the data processing device;
   a communications module operable to receive location information from the second data processing device; and
   a processor operable in a calibration phase to detect a mapping between an image location, in the images captured by the camera, of the optically detectable indicator of the second data processing device, the location information received from the second data processing device and the determined location of the data processing device.

2. A data processing device according to claim 1, in which the processor is configured to detect the mapping in response to received location information from the second data processing device indicating that the second data processing device is within a search range of a location which is included in a predetermined array of locations.

3. A data processing device according to claim 1, wherein the communications module is operable to transmit location information to another data processing device, the transmit location information indicating the determined location of the data processing device.

4. A data processing device according to claim 3, in which the communications module is operable to transmit location information only in response to a detection that the data processing device is within a search range of a location which is included in a predetermined array of locations.

5. A data processing device according to claim 1, in which the processor is configured to control detection of a location of the second data processing device by interpolation between the mappings.

6. A data processing device according to claim 1, in which the optically detectable indicator comprises an electrically illuminable element.

7. A data processing device according to claim 6, in which the optically detectable indicator comprises a light emitting diode.

8. A data processing device according to claim 1, the data processing device being a head mountable display.

9. A method of calibration operation of a data processing device, the method comprising:
   capturing successive images of an optically detectable indicator of a second data processing device;
   detecting a location of the data processing device;
   receiving location information from the second data processing device; and
   detecting, in a calibration phase, a mapping between an image location, in the captured images, of the optically detectable indicator of the second data processing device, the location information received from the second data processing device and the detected location of the data processing device.

10. A method of operation of a data processing device, the method comprising:
    capturing successive images of an optically detectable indicator of a second data processing device;
    detecting a location of the data processing device;
    detecting a location of the second data processing device by interpolation between the mappings detected by the method of claim 9.

11. A non-transitory machine-readable medium which stores computer software which, when executed by a computer, causes the computer to perform the method of claim 9.

* * * * *